United States Patent
Wilson et al.

(10) Patent No.: US 9,216,537 B2
(45) Date of Patent: Dec. 22, 2015

(54) COMPENSATION FOR HYDRAPAK MACHINE USING ISOLATOR CYLINDER

(75) Inventors: Brad Wilson, Manchester, MI (US); Kirk Edward Maki, Tecumseh, MI (US); George David Lisch, Jackson, MI (US)

(73) Assignee: Discma AG, Hünenberg (CH)

( * ) Notice: Subject to any disclaimer, the term of this patent is extended or adjusted under 35 U.S.C. 154(b) by 637 days.

(21) Appl. No.: 13/489,943

(22) Filed: Jun. 6, 2012

(65) Prior Publication Data

US 2012/0315348 A1 Dec. 13, 2012

Related U.S. Application Data

(60) Provisional application No. 61/495,072, filed on Jun. 9, 2011.

(51) Int. Cl.
*B29C 49/46* (2006.01)
*B65B 3/02* (2006.01)
(Continued)

(52) U.S. Cl.
CPC ............... *B29C 49/46* (2013.01); *B29C 49/56* (2013.01); *B65B 3/022* (2013.01); *B29C 49/12* (2013.01); *B29C 49/78* (2013.01); *B29C 49/783* (2013.01); *B29C 49/786* (2013.01); *B29C 2049/4652* (2013.01); *B29C 2049/4664* (2013.01); *B29C 2049/563* (2013.01); *B29C 2049/5865* (2013.01); *B29C 2049/5868* (2013.01); *B29C 2049/5872* (2013.01); *B29C 2049/5875* (2013.01); *B29C 2049/5889* (2013.01); *B29K 2023/06* (2013.01);
(Continued)

(58) Field of Classification Search
CPC .............................................. B29C 2049/4664
See application file for complete search history.

(56) References Cited

U.S. PATENT DOCUMENTS

| 3,267,185 A | 8/1966 | Freeman, Jr. |
| 3,268,635 A | 8/1966 | Kraus et al. |

(Continued)

FOREIGN PATENT DOCUMENTS

| DE | 4402091 | 8/1994 |
| EP | 0849514 | 6/1998 |

(Continued)

OTHER PUBLICATIONS

International Search Report and Written Opinion dated Feb. 1, 2013 in corresponding International Patent Application No. PCT/US2012/041084 (thirteen pages).

(Continued)

*Primary Examiner* — Ryan Ochylski
(74) *Attorney, Agent, or Firm* — Honigman Miller Schwartz and Cohn LLP; Eric J. Sosenko; Jonathan P. O'Brien

(57) ABSTRACT

An apparatus and method for simultaneously forming and filling a plastic container is provided. A mold having a mold cavity defines an internal surface and is adapted to accept a preform. A pressure source is operable to draw liquid through the inlet and urge it into the preform. A blow nozzle may be adapted to receive the liquid from the pressure source and transfer the liquid at high pressure into the preform thereby urging the preform to expand toward the internal surface of the mold cavity and create a resultant container. A pressure compensation system can exert a clamping force on the mold in response to the pressure source. The liquid remains within the container as an end product.

19 Claims, 7 Drawing Sheets

(51) Int. Cl.
*B29C 49/56* (2006.01)
*B29K 23/00* (2006.01)
*B29K 67/00* (2006.01)
*B29C 49/12* (2006.01)
*B29C 49/78* (2006.01)
*B29C 49/58* (2006.01)

(52) U.S. Cl.
CPC ....... *B29K 2023/12* (2013.01); *B29K 2067/003* (2013.01)

(56) References Cited

U.S. PATENT DOCUMENTS

| | | | |
|---|---|---|---|
| 3,993,427 | A | 11/1976 | Kauffman et al. |
| 4,039,641 | A | 8/1977 | Collins |
| 4,177,239 | A | 12/1979 | Gittner et al. |
| 4,321,938 | A | 3/1982 | Siller |
| 4,432,720 | A | 2/1984 | Wiatt et al. |
| 4,457,688 | A | 7/1984 | Calvert et al. |
| 4,490,327 | A | 12/1984 | Calvert et al. |
| 4,499,045 | A | 2/1985 | Obsomer |
| 4,539,172 | A | 9/1985 | Winchell et al. |
| 4,725,464 | A | 2/1988 | Collette |
| 4,883,631 | A | 11/1989 | Ajmera |
| 4,935,190 | A | 6/1990 | Tennerstedt |
| 5,129,815 | A | 7/1992 | Miyazawa et al. |
| 5,269,672 | A | 12/1993 | DiGangi, Jr. |
| 5,344,596 | A | 9/1994 | Hendry |
| 5,389,332 | A | 2/1995 | Amari et al. |
| 5,403,538 | A | 4/1995 | Maeda |
| 5,486,103 | A | 1/1996 | Meiring et al. |
| 5,540,879 | A | 7/1996 | Orimoto et al. |
| 5,599,496 | A | 2/1997 | Krishnakumar et al. |
| 5,622,735 | A | 4/1997 | Krishnakumar et al. |
| 5,635,226 | A | 6/1997 | Koda et al. |
| 5,687,550 | A | 11/1997 | Hansen et al. |
| 5,824,237 | A | 10/1998 | Stumpf et al. |
| 5,962,039 | A | 10/1999 | Katou et al. |
| 6,099,286 | A | 8/2000 | Nitsche |
| 6,214,282 | B1 | 4/2001 | Katou et al. |
| 6,277,321 | B1 | 8/2001 | Vailliencourt et al. |
| 6,485,670 | B1 | 11/2002 | Boyd et al. |
| 6,502,369 | B1 | 1/2003 | Andison et al. |
| 6,692,684 | B1 | 2/2004 | Nantin et al. |
| 6,729,868 | B1 | 5/2004 | Vogel et al. |
| 6,749,415 | B2 | 6/2004 | Boyd et al. |
| 6,767,197 | B2 | 7/2004 | Boyd et al. |
| 7,141,190 | B2 | 11/2006 | Hekal |
| 7,473,388 | B2 | 1/2009 | Desanaux et al. |
| 7,553,441 | B2 | 6/2009 | Shi |
| 7,771,184 | B2 * | 8/2010 | Venrooij et al. ........ B29C 33/24 425/127 |
| 7,914,726 | B2 | 3/2011 | Andison et al. |
| 7,981,356 | B2 | 7/2011 | Warner et al. |
| 8,017,064 | B2 | 9/2011 | Andison et al. |
| 8,096,483 | B2 | 1/2012 | Riney |
| 2001/0010145 | A1 | 8/2001 | Tawa et al. |
| 2005/0067002 | A1 | 3/2005 | Jones |
| 2005/0206045 | A1 | 9/2005 | Desanaux et al. |
| 2006/0097417 | A1 | 5/2006 | Emmer |
| 2006/0231646 | A1 | 10/2006 | Geary, Jr. |
| 2007/0163213 | A1* | 7/2007 | Till ......................... B29C 49/20 53/471 |
| 2008/0254160 | A1 | 10/2008 | Rousseau et al. |
| 2008/0271812 | A1 | 11/2008 | Stefanello et al. |
| 2010/0084493 | A1 | 4/2010 | Troudt |
| 2010/0136158 | A1* | 6/2010 | Andison et al. ............... 425/524 |
| 2010/0213629 | A1 | 8/2010 | Adriansens |
| 2010/0303946 | A1 | 12/2010 | Voth |
| 2011/0265433 | A1 | 11/2011 | Chauvin et al. |

FOREIGN PATENT DOCUMENTS

| | | |
|---|---|---|
| EP | 1529620 | 5/2005 |
| EP | 1577258 | 9/2005 |
| EP | 1688234 | 8/2006 |
| EP | 1880826 | 1/2008 |
| FR | 2659265 | 9/1991 |
| FR | 2813231 | 3/2002 |
| FR | 2887525 | 12/2006 |
| JP | 57123027 | 7/1982 |
| JP | 63-249616 | 10/1988 |
| JP | 09057834 | 3/1997 |
| JP | 09099477 | 4/1997 |
| JP | 10-217258 | 8/1998 |
| JP | 2000-043129 | 2/2000 |
| JP | 2005-254704 | 9/2005 |
| KR | 10-0147442 | 8/1998 |
| KR | 2006-0105883 | 10/2006 |
| KR | 10-2006-0128062 | 12/2006 |
| WO | WO02/24435 | 3/2002 |
| WO | WO03/095179 | 11/2003 |
| WO | WO2004/065105 | 8/2004 |
| WO | WO2005/044540 | 5/2005 |
| WO | WO2007/120807 | 10/2007 |
| WO | WO 2009/075791 | 6/2009 |

OTHER PUBLICATIONS

International Search Report and Written Opinion dated Sep. 28, 2012 in corresponding International Patent Application No. PCT/US2012/024954 (six pages).

International Search Report and Written Opinion dated Oct. 29, 2012 in corresponding International Patent Application No. PCT/US2012/024950 (seven pages).

International Search Report and Written Opinion dated Apr. 17, 2012 in corresponding International Patent Application No. PCT/US2011/051284 (nine pages).

International Search Report and Written Opinion dated Apr. 18, 2012 in corresponding International Patent Appliation No. PCT/US2011/051289 (nine pages).

International Search Report and Written Opinion dated May 8, 2012 in corresponding International Patent Application No. PCT/US2011/054584 (six pages).

International Search Report and Written Opinion dated May 9, 2012 in corresponding International Patent Application No. PCT/US2011/056053 (six pages).

International Search Report and Written Opinion dated May 30, 2012 in corresponding International Patent Application No. PCT/US2011/056057 (six pages).

Irmo/ V International Search Report and Written Opinion dated Jun. 15, 2012 in corresponding International Patent Application No. PCT/US2011/051293 (eight pages).

Supplementary European Search Report dated Jan. 21, 2014 in corresponding European patent application Serial No. Ep 12797531 (seven pages).

* cited by examiner

COMPENSATION FOR HYDRAPAK MACHINE USING ISOLATOR CYLINDER

CROSS-REFERENCE TO RELATED APPLICATIONS

This application claims the benefit of U.S. Provisional Application No. 61/495,072, filed on Jun. 9, 2011. The entire disclosure of the above application is incorporated herein by reference.

FIELD

This disclosure generally relates to forming and filling a plastic container. More specifically, this disclosure relates to an apparatus and method for creating sufficient clamping force to hold manufacturing molds in a closed position during high pressure container manufacturing, such as that used in processes employing simultaneous forming and filling of plastic containers.

BACKGROUND

This section provides background information related to the present disclosure which is not necessarily prior art.

As a result of environmental and other concerns, plastic containers, more specifically polyester and even more specifically polyethylene terephthalate (PET) containers are now being used more than ever to package numerous commodities previously supplied in glass containers. Manufacturers and fillers, as well as consumers, have recognized that PET containers are lightweight, inexpensive, recyclable and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container. The following equation defines the percentage of crystallinity as a volume fraction:

$$\% \text{ Crystallinity} = \left(\frac{\rho - \rho_a}{\rho_c - \rho_a}\right) \times 100$$

where $\rho$ is the density of the PET material; $\rho_a$ is the density of pure amorphous PET material (1.333 g/cc); and $\rho_c$ is the density of pure crystalline material (1.455 g/cc). Once a container has been blown, a commodity may be filled into the container.

Traditionally blow molding and filling have developed as two independent processes, in many cases operated by different companies. In order to make bottle filling more cost effective, some fillers have moved blow molding in house, in many cases integrating blow molders directly into their filling lines. The equipment manufacturers have recognized this advantage and are selling "integrated" systems that are designed to insure that the blow molder and the filler are fully synchronized. Despite the efforts in bringing the two processes closer together, blow molding and filling continue to be two independent, distinct processes. As a result, significant costs may be incurred while performing these two processes separately. Thus, there is a need for a liquid or hydraulic blow molding system suitable for forming and filling a container in a single operation. Moreover, there is a need for a modified preform that is particularly well-suited for molding system that form and fill a container in a single operation

SUMMARY

This section provides a general summary of the disclosure, and is not a comprehensive disclosure of its full scope or all of its features.

Accordingly, the present disclosure teaches a mold having a mold cavity defining an internal surface and adapted to accept a preform. A pressure source is operable to draw liquid through the inlet and urged it into the preform. A blow nozzle may be adapted to receive the liquid from the pressure source and transfer the liquid at high pressure into the preform thereby urging the preform to expand toward the internal surface of the mold cavity and create a resultant container. A pressure compensation system can exert a clamping force on the mold in response to the pressure source. The liquid remains within the container as an end product.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
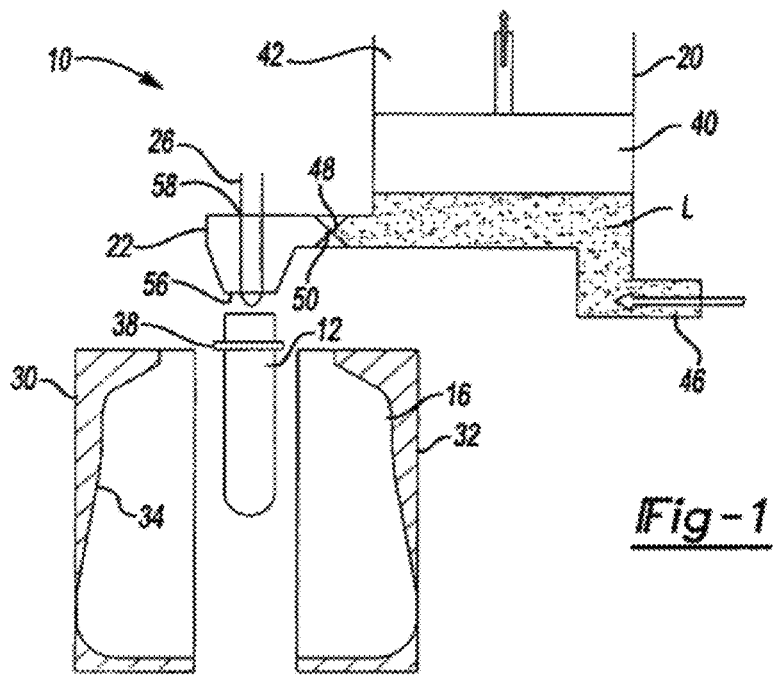
FIG. 1 is a schematic depiction of a heated preform passed into a mold station wherein a pressure source including a piston-like device begins to move upward, drawing liquid into the pressure source in accordance with the teachings of the present disclosure.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Singe-Step Forming and Filling Discussion

Figure 5:
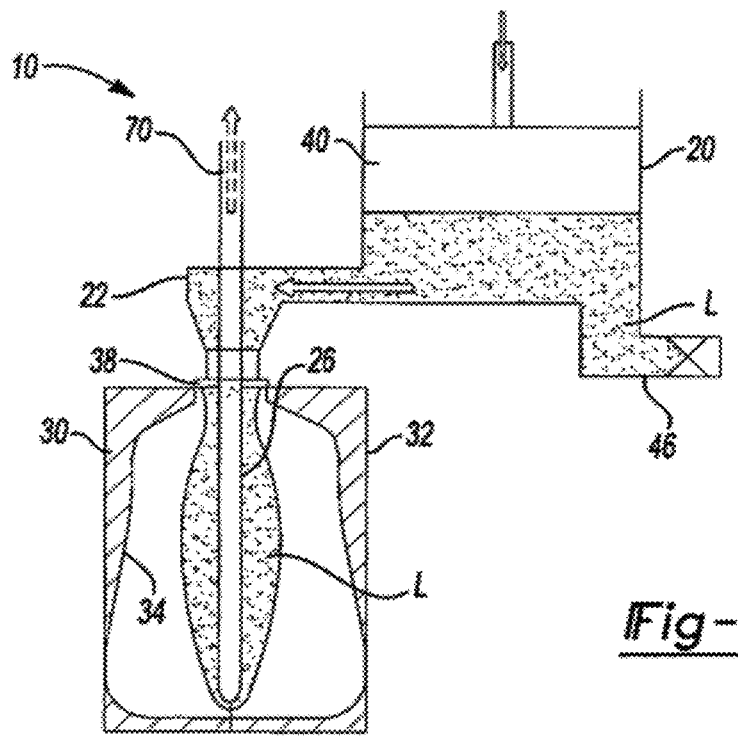
FIG. 5 is a schematic depiction of the system of FIG. 4 wherein the piston-like device drives the liquid from the pressure source to the preform thereby expanding the preform toward the walls of the mold cavity.
Figure 6:
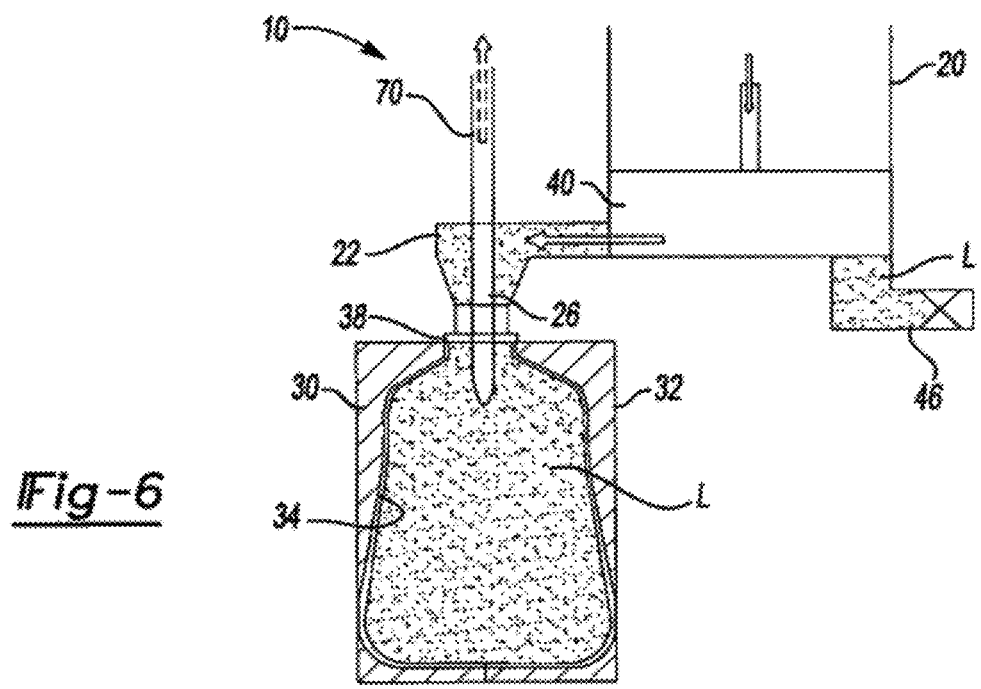
FIG. 6 is a schematic depiction of the system of FIG. 5 wherein the piston-like device has been fully actuated thereby completely transferring an appropriate volume of liquid to the newly formed container and wherein the stretch rod is withdrawing.
Figure 7:
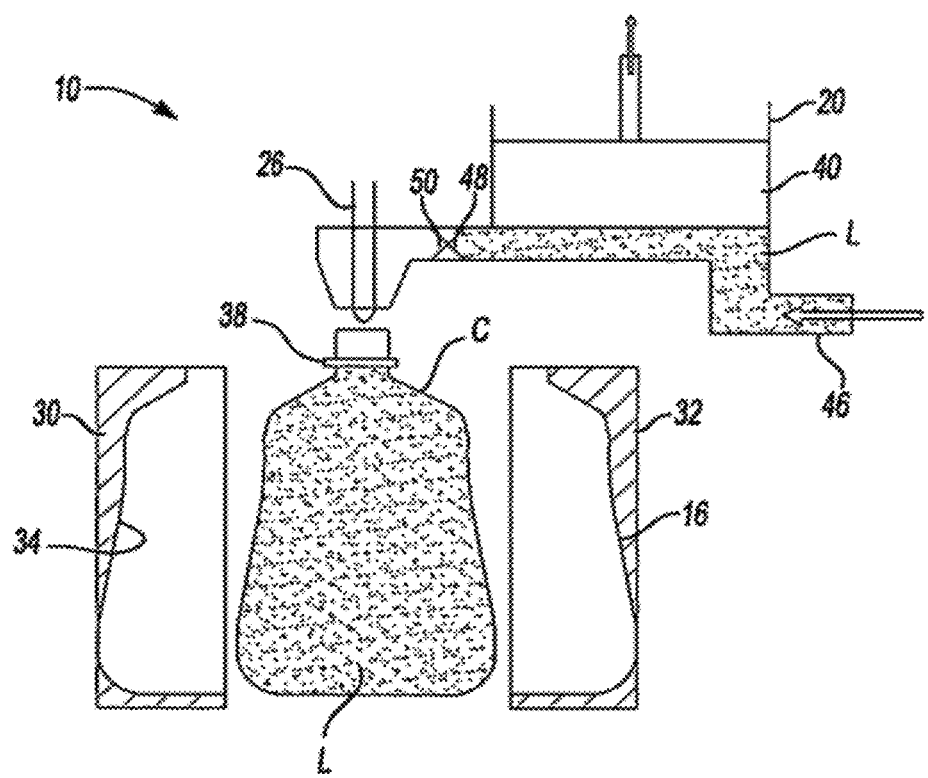
FIG. 7 is a schematic depiction of the system of FIG. 6 wherein the mold halves separate and the piston-like device begins to draw liquid into the pressure source in preparation for the next cycle.

With regard to FIGS. 1-9, a mold station 10 is provided that utilizes a final liquid commodity L to impart the pressure required to expand a hot preform 12 to take on the shape of a mold thus simultaneously forming and filling the resultant container C (FIG. 7).

With initial reference to FIG. 1, the mold station 10 will be described in greater detail. The mold station 10 generally includes a mold cavity 16, a pressure source 20, a blow nozzle 22 and a stretch rod 26. The exemplary mold cavity 16 illustrated includes mold halves 30, 32 that cooperate to define an interior surface 34 corresponding to a desired outer profile of a blown container. The mold cavity 16 may be moveable from an open position (FIG. 1) to a closed position (FIG. 2) such that a support ring 38 of the preform 12 is captured at an upper end of the mold cavity 16.

In one example, the pressure source 20 can be in the form of, but not limited to, a filling cylinder, manifold or chamber 42 that generally includes a mechanical piston-like device 40 including, but not limited to, a piston, a pump (such as a hydraulic pump) or any other such similarly suitable device, moveable within the filling cylinder, manifold or chamber 42. The pressure source 20 has an inlet 46 for accepting liquid commodity L and an outlet 48 for delivering the liquid commodity L to the blow nozzle 22. It is appreciated that the inlet 46 and the outlet 48 may have valves incorporated thereat. The piston-like device 40 may be moveable in a first direction (upward as viewed in the figures) to draw liquid commodity L from the inlet 46 into the filling cylinder, manifold or chamber 42, and in a second direction (downward as viewed in the figures) to deliver the liquid commodity L from the filling cylinder, manifold or chamber 42 to the blow nozzle 22. The piston-like device 40 can be moveable by any suitable method such as pneumatically, mechanically, electrically (servo), or hydraulically for example. The inlet 46 of the pressure source 20 may be connected, such as by tubing or piping to a reservoir or container (not shown) which contains the final liquid commodity L. It is appreciated that the pressure source 20 may be configured differently.

The blow nozzle 22 generally defines one or more inlets 50 for accepting the liquid commodity L from one or more outlets 48 of the pressure source 20 and an outlet 56 (FIG. 1) for delivering the liquid commodity L into the preform 12. It is appreciated that the outlet 56 may define a shape complementary to the preform 12 near the support ring 38 such that the blow nozzle 22 may easily mate with the preform 12 during the forming/filling process. In one example, the blow nozzle 22 may define an opening 58 for slidably accepting the stretch rod 26 used to initiate mechanical stretching of the preform 12 in some embodiments.

In one example, the liquid commodity L may be introduced into the plastic container C during a thermal process, typically a hot-fill process. For hot-fill bottling applications, bottlers generally fill the plastic container C with a liquid or product at an elevated temperature between approximately 185° F. to 205° F. (approximately 85° C. to 96° C.) and seal the plastic container C with a closure (not illustrated) before cooling. In one configuration, the liquid may be continuously circulated within the filling cylinder, manifold or chamber 42 through the inlet 46 whereby the liquid can be heated to a preset temperature (i.e., at a heat source (not illustrated) upstream of the inlet 46). In addition, the plastic container C may be suitable for other high-temperature pasteurization or retort filling processes, or other thermal processes as well. In another example, the liquid commodity L may be introduced into the plastic container C under ambient or cold temperatures. Accordingly, by way of example, the plastic container C may be filled at ambient or cold temperatures such as between approximately 32° F. to 90° F. (approximately 0° C. to 32° C.), and more preferably at approximately 40° F. (approximately 4.4° C.).

Figure 9:
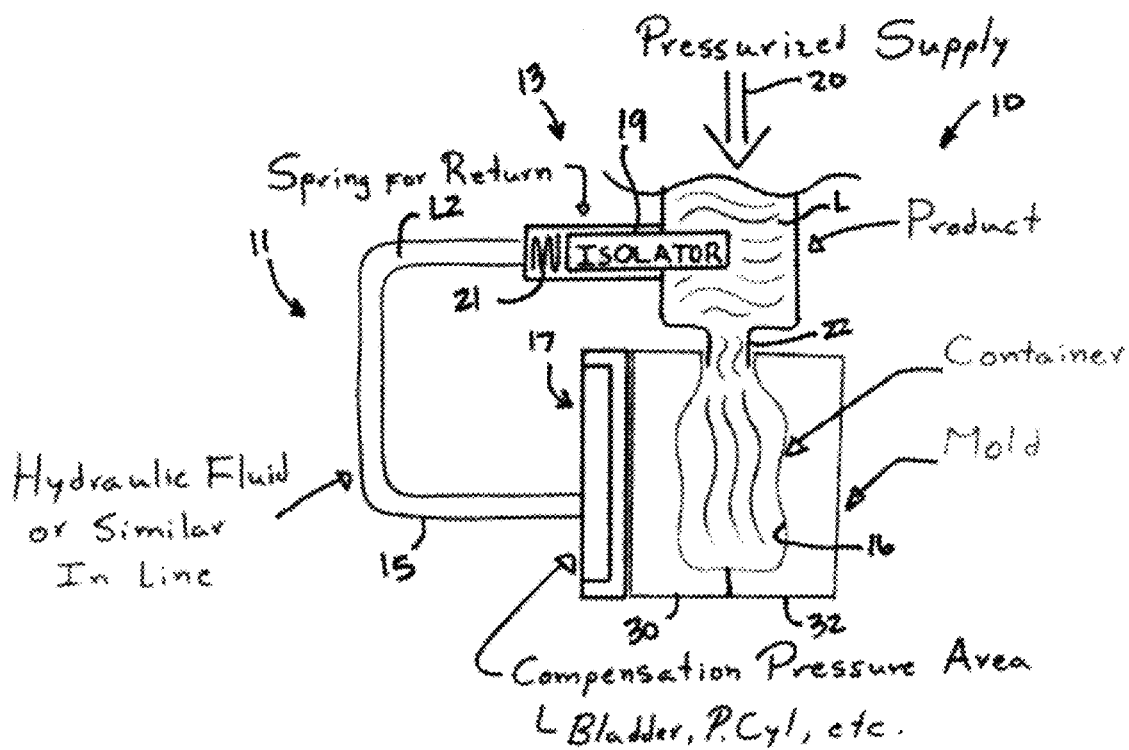
FIG. 9 is a schematic depiction of a mold station having a pressure compensation system for exerting a clamping force upon the mold in response to a pressure in the liquid commodity.

As illustrated in FIG. 9, in accordance with the principles of the present teachings, mold station 10 can comprise a pressure compensation system 11 to aid in exerting a force against at least one of the mold halves 30, 32 to provide clamping force sufficient to maintain mold cavity 16 in the closed position during molding of the container. Pressure compensation system 10 can at least in part supplement the closing system of mold halves 30, 32 to ensure proper definition of mold cavity 16.

Unlike conventional systems that might employ a high-pressure air circuit that is shared with a blow circuit, the present teachings do not require such an addition. It should be recognized that according to the principles of the present teachings, high-pressure air may not be available because the liquid product or commodity L is often used for both forming and filling of the container. Alternatively, it has been found that low-pressure air may not provide sufficient clamping force during container manufacturing to produce a high-quality parting line. Therefore, in accordance with some embodiments of the present teachings, pressure compensation system 11 can comprise an isolator system 13 operably coupled to pressure source 20, a line 15 operably coupling isolator system 13 to a compensation pressure applicator 17, whereby the compensation pressure applicator 17 can exert a clamping force on at least one mold half 30, 32 in response to the pressure of the forming and filling liquids.

In this way, the high-pressure liquids used for forming and filing of the container (i.e. liquid commodity L) can be indirectly/directly used for maintaining a clamping force on the mold halves 30, 32. However, because some embodiments of the present teachings use the final product or commodity as the forming and filling liquid, it may be desirable to employ systems or techniques to ensure the continued sterility of the liquid. To this end, circulation of the forming and filling liquid may be used; however, such circulation systems can increase required parts and system complexity.

Alternatively, in some embodiments, isolator system 13 can be an isolator cylinder 19 which is operable to transfer the pressure from the liquid commodity L to a separate liquid medium, hydraulic fluid or similar, L2 disposed in line 15. Separate liquid medium L2 is then operable to convey the pressure to the compensation pressure applicator 17 and create the necessary clamping force required. No additional recirculation system would be needed because the liquid commodity L would remain fluidly separate from the separate liquid medium L2.

In some embodiments, isolator cylinder 19 of isolator system 13 can comprise a biasing member 21 biasing isolator cylinder 19 against the fluid pressure of commodity liquid L. In some embodiments, isolator system 13 can be a diaphragm member being exposed on a first side to liquid commodity L and on the other side separate liquid medium L2, thereby permitting the transfer of pressure forces without the transfer or commingling of liquids.

Isolator system 13 can be positioned at any location within pressure compensation system 11 that is exposed to the high pressure of liquid commodity L. In some embodiments, the closer isolator system 13 is to the filling head or preform/container, the more the isolator system 13 will be influenced by fluctuations in pressure, such as in response to hydraulic shock created during molding. The actual pressure created by the separate liquid medium L2 for the clamping pressure can be increased by increasing the size of the isolator cylinder 19 within the isolator system 13 and/or by increasing the size/area of the compensation pressure applicator 17. Moreover, the size of isolator system 13, line 15, and compensation pressure applicator 17 can be varied to achieve a desired pressure, or amount of compression.

As illustrated herein, the high pressure of liquid commodity L will force the isolator cylinder 19 into the isolator system 13, thereby applying a hydraulic pressure to the separate liquid medium L2 and finally against one or more mold halves 30, 32 via compensation pressure applicator 17.

Figure 10:
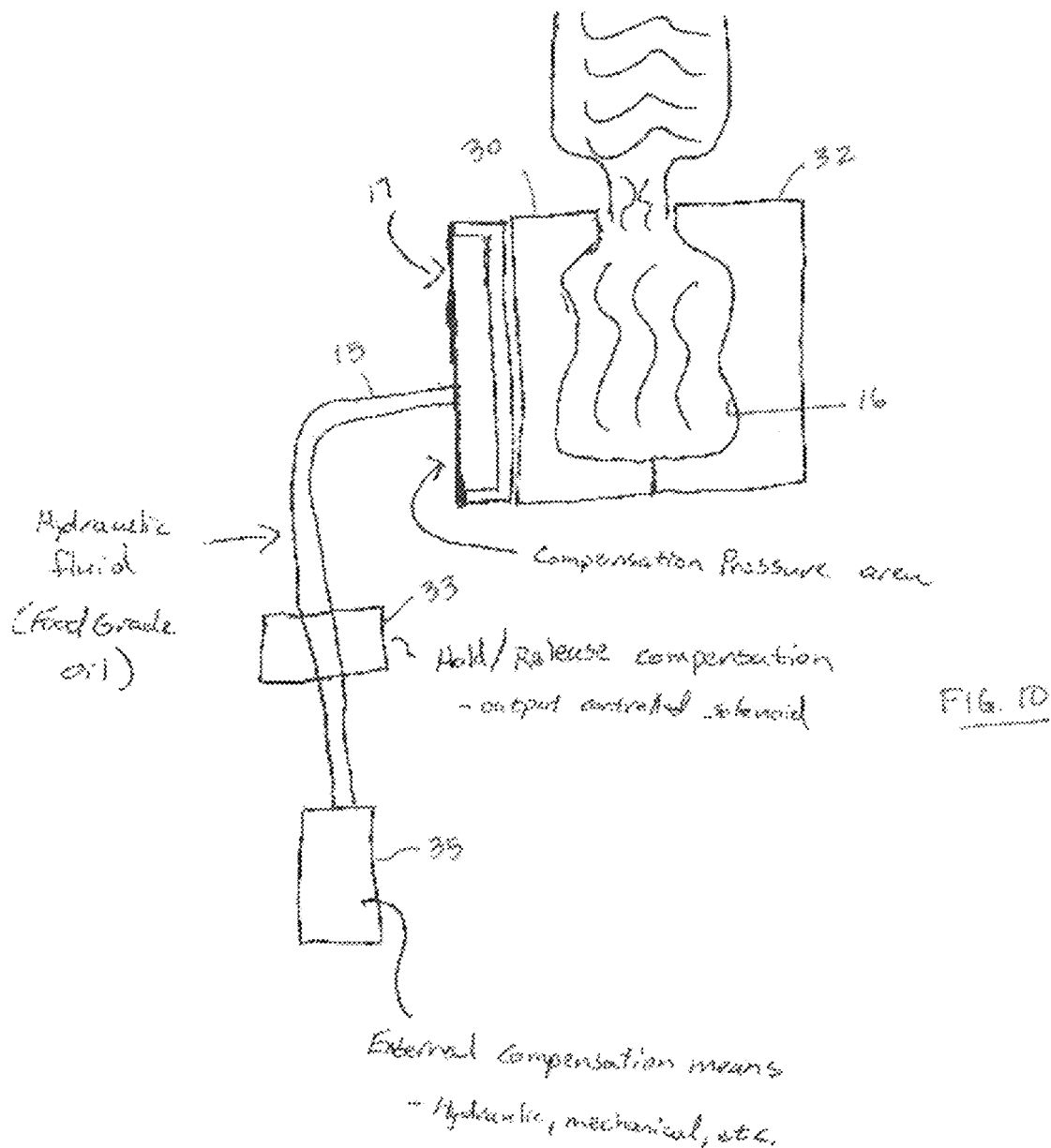
FIG. 10 is a schematic depiction of a mold station having a pressure compensation system for exerting a clamping force upon the mold in response to a pressure in the liquid commodity according to some embodiments.

Alternately, as illustrated in FIG. 10, the force applied to one or more of the mold halves 30, 32 could come from an external source, such as a servo control 33 and/or hydraulic pump 35. It should be understood that alternative external source can be used, such as solenoids, hydraulic devices, mechanical devices, servos, and the like. This is designed such that there are no crevices or stagnant areas for product to remain stationary and cause bacterial growth. This is also easily disassembled and cleaned for sanitary and hygiene issues or standard maintenance. This can be used to completely generate the clamping force necessary for compensation, or a portion of it as assistance to an alternate primary or secondary source.

Figure 2:
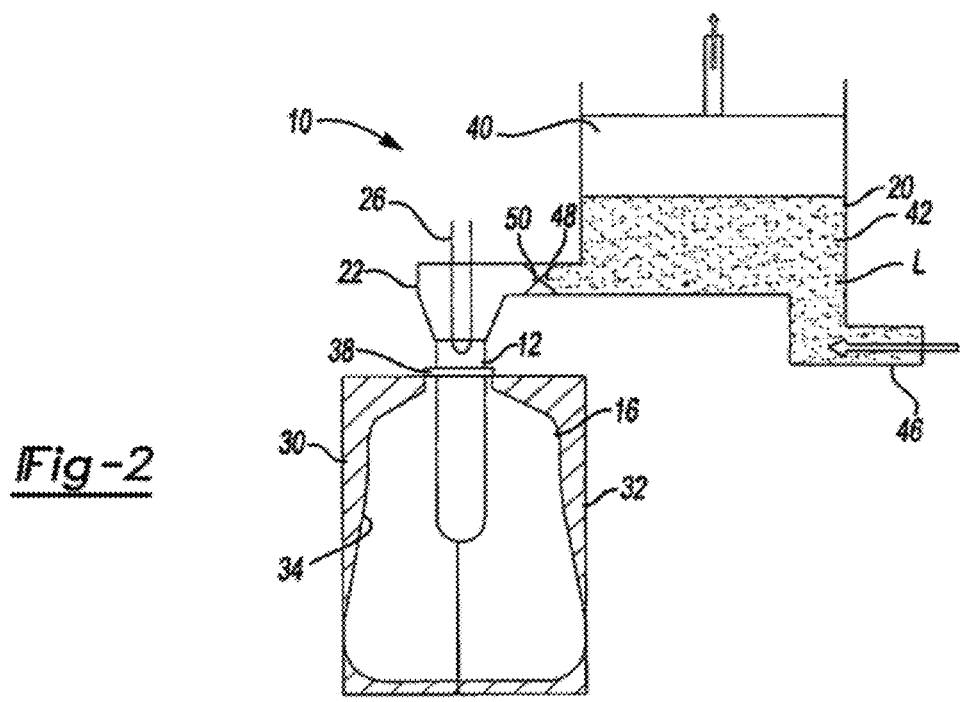
FIG. 2 is a schematic depiction of the system illustrated in FIG. 1 wherein the mold halves close around the preform and liquid continues to accumulate in the pressure source.

With reference now to all figures, an exemplary method of simultaneously forming and filling the plastic container C will be described. At the outset, the preform 12 may be placed into the mold cavity 16. In one example, a machine (not illustrated) places the preform 12 heated to a temperature between approximately 190° F. to 250° F. (approximately 88° C. to 121° C.) into the mold cavity 16. As the preform 12 is located into the mold cavity 16, the piston-like device 40 of the pressure source 20 may begin to draw liquid commodity L into the filling cylinder, manifold or chamber 42 through the inlet 46. It should be understood that piston-like device 40 can be filled prior to this stage, if desired, or at any other suitable time. The mold halves 30, 32 of the mold cavity 16 may then close thereby capturing the preform 12 (FIG. 2). The blow nozzle 22 may form a seal at the finish of the preform 12. The mold cavity 16 may be heated to a temperature between approximately 250° F. to 350° F. (approximately 93° C. to 177° C.) in order to impart increased crystallinity levels within the resultant container C. In another example, the mold cavity 16 may be provided at ambient or cold temperatures between approximately 32° F. to 90° F. (approximately 0° C. to 32° C.). Liquid commodity L may continue to be drawn into the filling cylinder, manifold or chamber 42 by the piston-like device 40.

Figure 3:
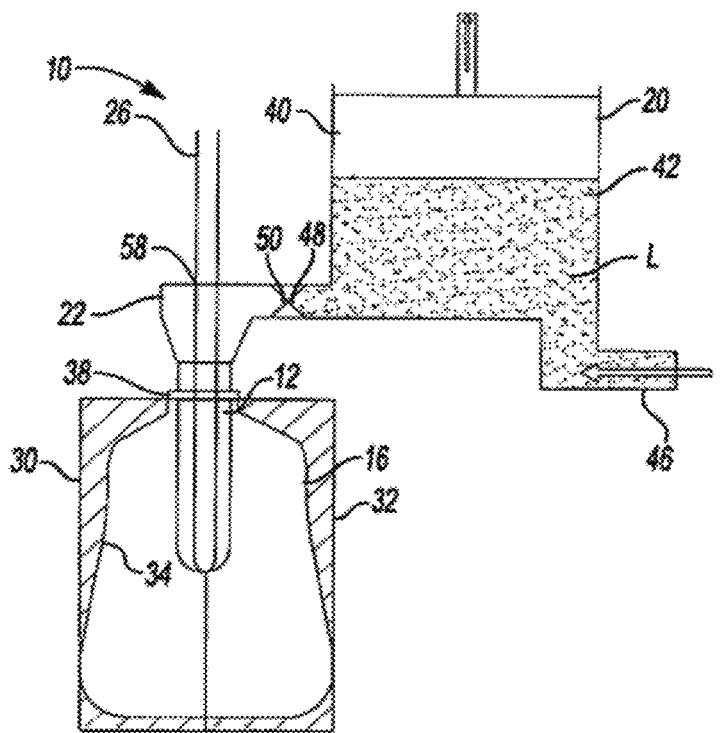
FIG. 3 is a schematic depiction of the system illustrated in FIG. 2 wherein a stretch rod extends into the preform to initiate mechanical stretching and wherein fluid continues to accumulate in the pressure source.
Figure 4:
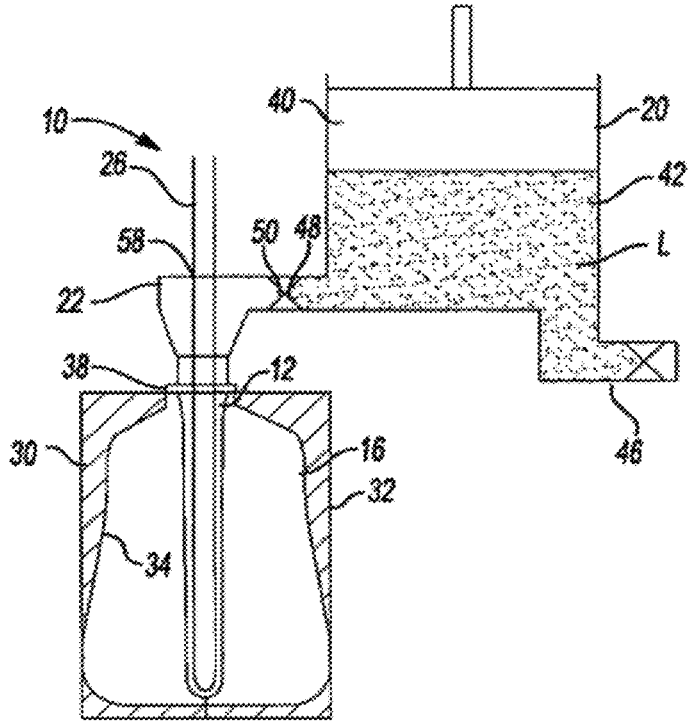
FIG. 4 is a schematic depiction of the system of FIG. 3 wherein the stretch rod stretches the preform and wherein fluid has been fully accumulated in the pressure source.

Turning now to FIG. 3, the stretch rod 26 may extend into the preform 12 to initiate mechanical stretching in some embodiments. At this point, the liquid commodity L may continue to be drawn into the filling cylinder, manifold or chamber 42. With reference to FIG. 4, the stretch rod 26 continues to stretch the preform 12 thereby thinning the sidewalls of the preform 12. The volume of liquid commodity L in the filling cylinder, manifold or chamber 42 may increase until the appropriate volume suitable to form and fill the resultant container C is reached. At this point, a valve disposed at the inlet 46 of the pressure source 20 may be closed.

With specific reference to FIG. 5, the piston-like device 40 may begin to drive downward (drive phase) to initiate the rapid transfer of liquid commodity L from the filling cylinder, manifold or chamber 42 to the preform 12. Again, the piston-like device 40 may be actuated by any suitable means such as pneumatic, mechanical, electrical (servo), and/or hydraulic pressure. In one example, the hydraulic pressure within the preform 12 may reach between approximately 100 PSI to 1000 PSI. The liquid commodity L causes the preform 12 to expand toward the interior surface 34 of the mold cavity 16. In some embodiments, as described herein and illustrated in FIG. 9, pressure compensation system 11 can be used to exert a clamping force on at least one of mold halves 30, 32 by directly or indirectly transferring the pressure force of liquid commodity L to a separate liquid medium L2 (in some embodiments) that drives a compensation pressure applicator 17 against one or more mold halves 30, 32.

Residual air may be vented through a passage 70 defined in the stretch rod 26 (FIG. 5). As shown in FIG. 6, the piston-like device 40 has completed its drive phase thereby completely transferring the appropriate volume of liquid commodity L to the newly formed plastic container C. Next, the stretch rod 26 may be withdrawn from the mold cavity 16 while continuing to vent residual air. The stretch rod 26 may be designed to displace a predetermined volume of liquid commodity L when it is withdrawn from the mold cavity 16 thereby allowing for the desired fill level of liquid commodity L within the resultant plastic container C and/or the desired headspace. Generally, the desired fill level and/or headspace will correspond between the level of the support ring 38 and the mid-shoulder area of the plastic container C.

Alternatively, liquid commodity L can be provided at a constant pressure or at different pressures during the molding cycle. For example, during axial stretching of the preform 12, liquid commodity L may be provided at a pressure which is less than the pressure applied when the preform 12 is blown into substantial conformity with the interior surface 34 of the mold cavity 16 defining the final configuration of the plastic container C. This lower pressure $P_1$ may be ambient or greater than ambient but less than the subsequent high pressure $P_2$. The preform 12 is axially stretched in the mold cavity 16 to a length approximating the final length of the resultant plastic container C. During or just after stretching the preform 12, the preform 12 is generally expanded radially outward under the low pressure $P_1$. This low pressure $P_1$ is preferably in the range of between approximately 100 PSI to 150 PSI and can be held for a predetermined amount of time, such as 0.1 to 0.2 seconds. Subsequently, the preform 12 is further expanded under the high pressure $P_2$ such that the preform 12 contacts the interior surface 34 of the mold halves 30, 32 thereby forming the resultant plastic container C. Preferably, the high pressure $P_2$ is in the range of approximately 400 PSI to 600 PSI and can be held for a predetermined amount of time, such as 0.1 to 0.2 seconds. As a result of the above method, the base and contact ring of the resultant plastic container C is fully formed.

Optionally, more than one piston-like device may be employed during the formation of the resultant plastic container C. For example, a primary piston-like device may be used to generate the low pressure $P_1$ to initially expand the preform 12 while a secondary piston-like device may be used to generate the subsequent high pressure $P_2$ to further expand the preform 12 such that the preform 12 contacts the interior surface 34 of the mold halves 30, 32 thereby forming the resultant plastic container C.

With reference to FIG. 7, the fill cycle is shown completed. The mold halves 30, 32 may separate and the blow nozzle 22 may be withdrawn. The resultant filled plastic container C is now ready for post-forming steps such as capping, cooling (if necessary), labeling and packing. At this point, the piston-like device 40 may begin the next cycle by drawing liquid commodity L through the inlet 46 of the pressure source 20 in preparation for the next fill/form cycle. While not specifically shown, it is appreciated that the mold station 10 may include a controller for communicating signals to the various components. In this way, components such as, but not limited to, the mold cavity 16, the blow nozzle 22, the stretch rod 26, the piston-like device 40 and various valves may operate according to a signal communicated by the controller. It is also contemplated that the controller may be utilized to adjust various parameters associated with these components according to a given application.

It should be appreciated that in some embodiments, a movable filling cylinder, manifold, or chamber may not provide sufficient space optimization or facility efficiency. Moreover, in some embodiments, it may be difficult to obtain and/or route pressurized fluid from a first location to the preform shaping location.

Figure 8:
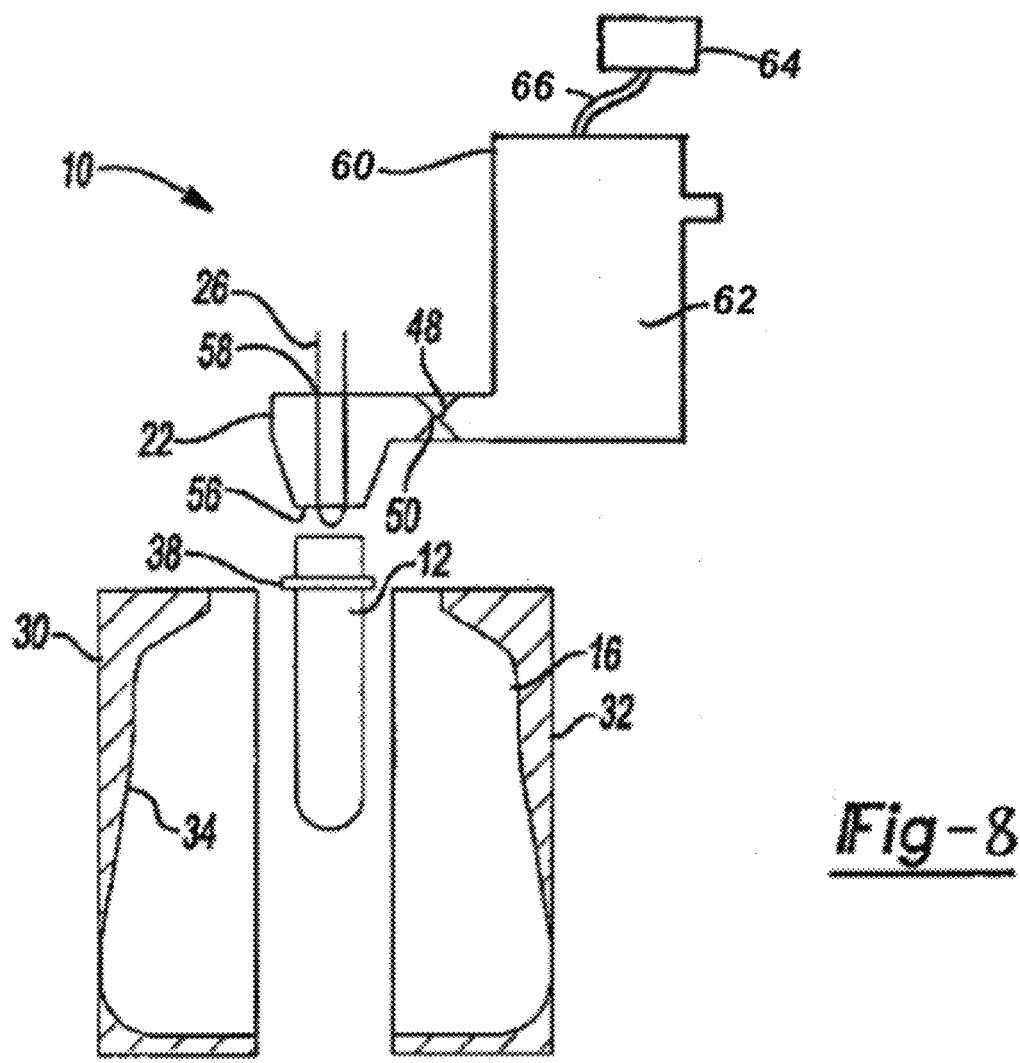
FIG. 8 is a schematic depiction of a heated preform passed into a mold station wherein a pressure source including a servo motor system in accordance with the teachings of the present disclosure.

Therefore, in other examples as illustrated in FIG. 8, the pressure source 20 can be in the form of a servo system 60 that generally includes one or more servo motors 62 being actuated by one or more controllers 64 via a line 66. The servo system 60 can be positioned adjacent to the preform shaping location. The servo system 60 can comprise inlet 46 for accepting liquid commodity L and outlet 48 for delivering the liquid commodity L to the blow nozzle 22. The servo motor 62 may be operable in a first direction to draw liquid commodity L from the inlet 46 and output the liquid commodity L from the outlet 48 to the blow nozzle 22 (i.e. forward flow). The servo motor 62, in some embodiments, may also be operable in a second direction to draw liquid commodity L from outlet 48, blow nozzle 22, and/or preform 12 (i.e. reverse flow), which will be discussed in greater detail herein.

In some embodiments, servo motor 62 can be used to overcome some of the difficulties in metering precise and/or minute quantities of commodity L. That is, servo motor 62 is precisely and variably controlled to permit precise metering of a through flow of commodity L and at a variable rate. This precise and variably control can be coupled with a feedback loop to provide active and real-time monitoring and control of the fill process, including stopping of the filling process in the event of a detected issue, such as a blow-out. In this way, the feedback loop can be formed as part of controller 64, with appropriate sensors disposed at any one of a number of locations provide sufficient data to detect a relevant parameter (e.g. pressure sensors, flow sensors, shape sensors, and the like). Because active control of the pressures and quantity of flow of commodity L is often important to the final formed product, the use of servo system 60 is particularly well suited to provide such benefits.

It should be recognized that servo system 60 may require less electrical power to operate, thereby providing additional benefits in terms of reduced electrical consumption and cost. That is, it has been found that servo system 60 uses merely 10% of the electricity required for a similar high pressure air system.

The method described herein may be particularly useful for filling applications such as isotonic, juice, tea and other commodities that are susceptible to biological contamination. As such, these commodities are typically filled in a controlled, sterile environment. Commercially, two ways are typically used to achieve the required sterile environment. In Europe, one primary method for filling these types of beverages is in an aseptic filling environment. The filling operation is performed in a clean room. All of the components of the product including the packaging must be sterilized prior to filling. Once filled, the product may be sealed until it is consumed preventing any potential for the introduction of bacteria. The process is expensive to install and operate. As well, there is always the risk of a bacterial contaminant breaking through the operational defenses and contaminating the product.

There are many other bottled products where this technology may be applicable. Products such as dairy products, liquor, household cleaners, salad dressings, sauces, spreads, syrups, edible oils, personal care items, and others may be bottled utilizing such methods. Many of these products are currently in blow molded PET containers but are also in extrusion molded plastic containers, glass bottles and/or cans. This technology has the potential of dramatically changing the economics of package manufacture and filling.

While much of the description has focused on the production of PET containers, it is contemplated that other polyolefin materials (e.g., polyethylene, polypropylene, etc.) as well as a number of other thermoplastics may be processed using the teachings discussed herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for simultaneously forming and filling a container comprising:
    a mold having a mold cavity defining an internal surface and adapted to accept a preform;
    a pressure source urging a first liquid toward the preform;
    a blow nozzle adapted to receive the first liquid from the pressure source and transfer the first liquid at a pressure or volume into the preform thereby urging the preform to expand toward the internal surface of the mold cavity and create a resultant container, wherein the first liquid remains within the container as an end product; and
    a pressure compensation system configured to exert a clamping force on said mold, the pressure compensation system being operably connected to the pressure source and exerting the clamping force in response to the pressure of the pressure source.

2. The system for simultaneously forming and filling a container according to claim 1, further comprising at least one servo motor and a controller, wherein the at least one servo motor is variably controlled.

3. The system simultaneously forming and filling a container according to claim 1 wherein the liquid is transferred into the preform during a hot-fill process.

4. The system for simultaneously forming and filling a container according to claim 3 wherein the first liquid is transferred into the preform at a temperature between approximately 185° F. (85° C.) and 205° F. (96° C.).

5. The system for simultaneously forming and filling a container according to claim 1 wherein the first liquid is transferred into the preform at an ambient temperature.

6. The system for simultaneously forming a filling a container according to claim 5 wherein the first liquid is transferred into the preform at a temperature between approximately 32° F. (0° C.) and 90° F. (32° C.).

7. The system for simultaneously forming and filling a container according to claim 1 wherein the mold cavity accepts a preform heated to a temperature between approximately 190° F. (88° C.) and 250° F. (121° C.).

8. The system for simultaneously forming a filling a container according to claim 1 wherein the mold cavity is heated to a temperature between approximately 250° F. (93° C.) and 350° F. (177° C.).

9. The system for simultaneously forming and filling a container according to claim 1 wherein the mold cavity is at temperature between approximately 32° F. (0° C.) and 90° F. (32° C.).

10. The system for simultaneously forming and filling a container according to claim 1 wherein the first liquid is transferred into the preform at a pressure between approximately 100 PSI and 600 PSI.

11. The system for simultaneously forming and filling a container according to claim 1, further comprising a stretch rod adapted to extend into the preform and mechanically stretch the preform prior to the first liquid being urged into the preform.

12. The system for simultaneously forming and filling a container according to claim 11 wherein the stretch rod is vented to atmosphere.

13. The system for simultaneously forming and filling a container according to claim 1 wherein the preform is initially expanded outwardly under a first pressure and subsequently expanded outwardly under a second pressure, the second pressure being greater than the first pressure.

14. The system for simultaneously forming and filling a container according to claim 13 wherein the first pressure is between approximately 100 PSI and 150 PSI, and the second pressure is between approximately 400 PSI and 600 PSI.

15. A system for simultaneously forming and filling a container comprising:
    a mold having a mold cavity defining an internal surface and adapted to accept a preform;
    a pressure source urging a first liquid toward the preform;
    a blow nozzle adapted to receive the first liquid from the pressure source and transfer the first liquid at a pressure or volume into the preform thereby urging the preform to expand toward the internal surface of the mold cavity and create a resultant container, wherein the first liquid remains within the container as an end product; and
    a pressure compensation system exerting a clamping force on said mold in response to the pressure source;
    wherein said pressure compensation system further comprises a compensation pressure applicator operably engaging said mold for exerting said clamping force; and
    an isolator system operably coupled to said pressure source for transferring a pressure from the first liquid to a line coupled to said compensation pressure applicator.

16. The system for simultaneously forming and filling a container according to claim 15 wherein said isolator system comprises an isolator cylinder transferring said pressure from the first liquid to a second liquid disposed in said line, said first liquid being fluidly isolated from said second liquid.

17. The system for simultaneously forming and filling a container according to claim 16 wherein said isolator cylinder is spring biased against said pressure of said pressure source.

18. The system for simultaneously forming and filling a container according to claim 15 wherein said isolator system comprises a diaphragm transferring said pressure from the first liquid to a second liquid disposed in said line, said first liquid being fluidly isolated from said second liquid.

19. A system for simultaneously forming and filling a container comprising:
  a mold having a mold cavity defining an internal surface and adapted to accept a preform;
  a pressure source urging a first liquid toward the preform;
  a blow nozzle adapted to receive the first liquid from the pressure source and transfer the first liquid at a pressure or volume into the preform thereby urging the preform to expand toward the internal surface of the mold cavity and create a resultant container, wherein the first liquid remains within the container as an end product; and
  a pressure compensation system configured to exert a clamping force on said mold and to utilize the pressure of the first liquid to exert the clamping force.

* * * * *